United States Patent
Wimmer et al.

(10) Patent No.: US 10,732,012 B2
(45) Date of Patent: Aug. 4, 2020

(54) WIRELESS SENSOR SYSTEM

(71) Applicant: Nortek Security & Control LLC, Carlsbad, CA (US)

(72) Inventors: Jason Patrick Wimmer, Mollala, OR (US); Jason Alan Cane, Ridgefield, WA (US); Keith Teare, Carlsbad, CA (US); Robert Beliles, Carlsbad, CA (US)

(73) Assignee: Nortek Security & Control LLC, Carlsbad, CA (US)

( * ) Notice: Subject to any disclaimer, the term of this patent is extended or adjusted under 35 U.S.C. 154(b) by 0 days.

(21) Appl. No.: 15/945,253

(22) Filed: Apr. 4, 2018

(65) Prior Publication Data
US 2018/0224306 A1    Aug. 9, 2018

Related U.S. Application Data

(63) Continuation-in-part of application No. 15/578,647, filed as application No. PCT/US2016/035555 on Jun. 2, 2016.
(Continued)

(51) Int. Cl.
| | | |
|---|---|---|
| *G01D 11/30* | (2006.01) | |
| *G01D 5/14* | (2006.01) | |

(Continued)

(52) U.S. Cl.
CPC .............. *G01D 11/30* (2013.01); *F24C 7/082* (2013.01); *G01D 5/14* (2013.01); *G01D 21/00* (2013.01); *G05G 1/10* (2013.01); *H04W 84/18* (2013.01)

(58) Field of Classification Search
None
See application file for complete search history.

(56) References Cited

U.S. PATENT DOCUMENTS

| | | |
|---|---|---|
| 4,199,741 A | 4/1980 | Serrus Paulet |
| 4,446,455 A | 5/1984 | Nashawaty |

(Continued)

FOREIGN PATENT DOCUMENTS

| | | |
|---|---|---|
| CN | 202215818 U | 5/2012 |
| CN | 203615374 A | 5/2014 |

(Continued)

OTHER PUBLICATIONS

"", [online]. (c) 2011 Ubiq Solutions. [archived on Apr. 21, 2016]. Retrieved from the Internet: <URL: https://web.archive.org/web/20160421170637/http://unnderbar.se/ubiqisolutions/smarthome.html, (2011), 5 pgs.

(Continued)

*Primary Examiner* — Jas A Sanghera
(74) *Attorney, Agent, or Firm* — Schwegman Lundberg & Woessner, P.A.

(57) ABSTRACT

A wireless sensor system includes a sensor assembly and a sensor trigger assembly. The sensor assembly includes a housing configured to be coupled to a device actuated by a rotary actuator, at least two position sensors disposed within the housing, and a power source disposed within the housing and configured to provide power to the at least two position sensors. The housing and the at least two position sensors and the power source disposed therein are coupled to the device such that the sensor assembly is stationary. The sensor trigger assembly is configured to be coupled to and rotate with a rotatable shaft of the rotary actuator. The sensor trigger assembly includes a sensor trigger carrier configured to be coupled to the rotatable shaft and a sensor trigger connected to the sensor trigger carrier. The at least two position sensors are disposed in a first position relative to the sensor trigger to sense a change in a rotational position of the sensor trigger when the rotatable shaft rotates.

8 Claims, 4 Drawing Sheets

Related U.S. Application Data (60) Provisional application No. 62/481,416, filed on Apr. 4, 2017.

(51) Int. Cl.
*G01D 21/00* (2006.01)
*G05G 1/10* (2006.01)
*F24C 7/08* (2006.01)
*H04W 84/18* (2009.01)

(56) References Cited

U.S. PATENT DOCUMENTS

| | | | |
|---|---|---|---|
| 4,756,336 | A | 7/1988 | Amezcua |
| 5,518,028 | A | 5/1996 | Walker |
| 5,608,378 | A | 3/1997 | McLean et al. |
| 5,717,188 | A | 2/1998 | Vaillancourt |
| 6,294,994 | B1 | 9/2001 | Hoellerich |
| 6,314,994 | B1 | 11/2001 | Listl |
| 6,733,146 | B1 | 5/2004 | Vastano |
| 7,002,109 | B2 | 2/2006 | Klask |
| 8,322,366 | B2 | 12/2012 | Sullivan |
| 8,919,375 | B2 | 12/2014 | Duboy et al. |
| 8,928,187 | B2 | 1/2015 | Hamm |
| 9,605,852 | B2 | 3/2017 | Porraro |
| 2006/0202848 | A1 | 9/2006 | Volodarsky |
| 2009/0064809 | A1* | 3/2009 | Miret .............. G01D 5/2412 74/10 R |
| 2011/0140908 | A1 | 6/2011 | Kosht et al. |
| 2013/0113465 | A1 | 5/2013 | Padilla |
| 2013/0206258 | A1 | 8/2013 | Duboy et al. |
| 2013/0220779 | A1 | 8/2013 | Kerner et al. |
| 2013/0314239 | A1 | 11/2013 | Clark et al. |
| 2014/0208958 | A1 | 7/2014 | Porraro |
| 2014/0230661 | A1 | 8/2014 | Stilo et al. |
| 2015/0070002 | A1* | 3/2015 | Schott .............. G01D 5/145 324/207.2 |
| 2015/0196161 | A1 | 7/2015 | Myllymaki |
| 2015/0339917 | A1 | 11/2015 | Messing et al. |
| 2016/0063837 | A1 | 3/2016 | Shao et al. |

FOREIGN PATENT DOCUMENTS

| | | |
|---|---|---|
| CN | 204213452 U | 3/2015 |
| CN | 204557140 U | 8/2015 |
| CN | 108027086 | 5/2018 |
| EP | 2341270 A1 | 7/2011 |
| JP | 2015148356 A | 8/2015 |
| WO | WO-2016196819 | 12/2016 |
| WO | WO-2016196819 A3 | 12/2016 |

OTHER PUBLICATIONS

"Burner Alert", [online]. [retrieved May 31, 2016]. Retrieved from the Internet: https://burneralert.com/buyit/faqs/, 2 pgs.

"International Application Serial No. PCT/US2016/035555, International Preliminary Report on Patentability dated Dec. 14, 2017", 10 pgs.

"International Application Serial No. PCT/US2016/035555, International Search Report dated Nov. 22, 2016", 4 pgs.

"International Application Serial No. PCT/US2016/035555, Invitation to Pay Add'l Fees and Partial Search Report dated Sep. 23, 2016", 3 pgs.

"International Application Serial No. PCT/US2016/035555. Written Opinion dated Nov. 22, 2016", 8 pgs.

"Machnine Translation of CN2004557140U, published on Aug. 12, 2015", 6 pgs.

"U.S. Appl. No. 15/578,647, Non Final Office Action dated Dec. 5, 2019", 11 pgs.

"Chinese Application Serial No. 201680038279.X, Examiner Interview Summary dated Jul. 3, 2019", 1 pg.

"Chinese Application Serial No. 201680038279.X, Office Action dated Jan. 30, 2019", w/English Translation, 16 pgs.

"Chinese Application Serial No. 201680038279.X, Response filed Jun. 12, 2019 to Office Action dated Jan. 30, 2019", w/ English claims, 19 pgs.

"Chinese Application Serial No. 201680038279.X, Response filed Jul. 16, 2019 to Examiner Interview Summary dated Jul. 3, 2019", w/ English claims, 12 pgs.

"U.S. Appl. No. 15/578,647, Final Office Action dated May 21, 2020", 9 pgs.

"U.S. Appl. No. 15/578,647, Response filed Mar. 31, 2020 to Non Final Office Action dated Dec. 5, 2019", 10 pgs.

"U.S. Appl. No. 15/578,647, Response filed Jun. 11, 2020 to Final Office Action dated May 21, 2020", 10 pgs.

\* cited by examiner

FIG. 2C

WIRELESS SENSOR SYSTEM

PRIORITY APPLICATIONS

This application claims the benefit of priority under 35 U.S.C. 119(e) to U.S. Provisional Application No. 62/481,416, filed on Apr. 4, 2017, this application is also a continuation-in-part of U.S. application Ser. No. 15/578,647, filed Nov. 30, 2017 and which claims priority from Patent Cooperation Treaty App. No. PCT/US2016/035555, filed Jun. 2, 2016, which applications are incorporated herein by reference in their entireties.

DESCRIPTION OF DRAWINGS

In the drawings, which are not necessarily drawn to scale, like numerals may describe similar components in different views. Like numerals having different letter suffixes may represent different instances of similar components, sub-components of a larger logical or physical system, or the like. The drawings illustrate generally, by way of example, but not by way of limitation, various examples described in the present disclosure.

DETAILED DESCRIPTION

The inventor(s) recognize, among other things, an opportunity for retrofitting existing rotary actuators with a position sensor system that can wirelessly communicate the position of the rotary actuator and thereby the operational state of the device or system actuated thereby.

Some appliances and other devices have manually operated actuators, such as switches and valves, used to control or otherwise operate the appliance. For example, an actuator on a stove or range controls heating elements by turning on and adjusting the level of the heating elements. Many stoves have wired actuator position sensors connected to a light that indicates whether a heating element of the stove is on or off. Accordingly, the operational state of the actuator or valve is usually readily apparent to a user observing the light.

It is often useful to know the operational state of an actuator when there is no one present to observe it. In examples according to this disclosure, a rotary actuator sensor system includes a wireless transmitter, which is configured to receive and wirelessly communicate the position of the actuator and thereby the operational state of the device actuated thereby. Accordingly, the disclosed techniques provide- and may be used to quickly and easily retrofit—an actuator (e.g., on an appliance or other device) with a wireless position sensor that can be readily installed by a typical homeowner lacking specialized knowledge or tools.

A number of examples of a wireless sensor system are disclosed, which are each configured to wirelessly transmit information regarding the rotational position of a stem or shaft of a rotary actuator to a remote device, including, for example, a home computer, a home security system or a mobile phone. Examples according to this disclosure may be employed in a variety of applications and systems/devices, including valves and switches, or different types of appliances, including stoves, ranges, BBQ grills, and washing machines, as examples.

FIGS. 1A-1D depict an example wireless sensor system 100 in accordance with this disclosure. Example wireless sensor system 100 includes sensor assembly 102 and sensor trigger assembly 104 (hidden in FIG. 1A, see FIGS. 1B-1C). Wireless sensor system 100 is depicted mounted to an existing rotary actuator 106 of a device, such as a gas or electric stove, range, or oven. Although this example is described in the context of a specific device like a stove, range or oven, examples according to this disclosure may be applied to and employed in conjunction with other devices and systems.

Rotary actuator 106 includes control knob 108, shaft 110 (hidden in FIG. 1A, see FIG. 2A), and device base 112. Shaft 110 is rotatably connected to the device (for example, stove) and protrudes through a hole in device base 112. Control knob 108 is removably coupled to shaft 110 such that the two rotate together when control knob is turned. Both control knob 108 and shaft 110 rotate relative to the stationary base 112.

Figure 1A:
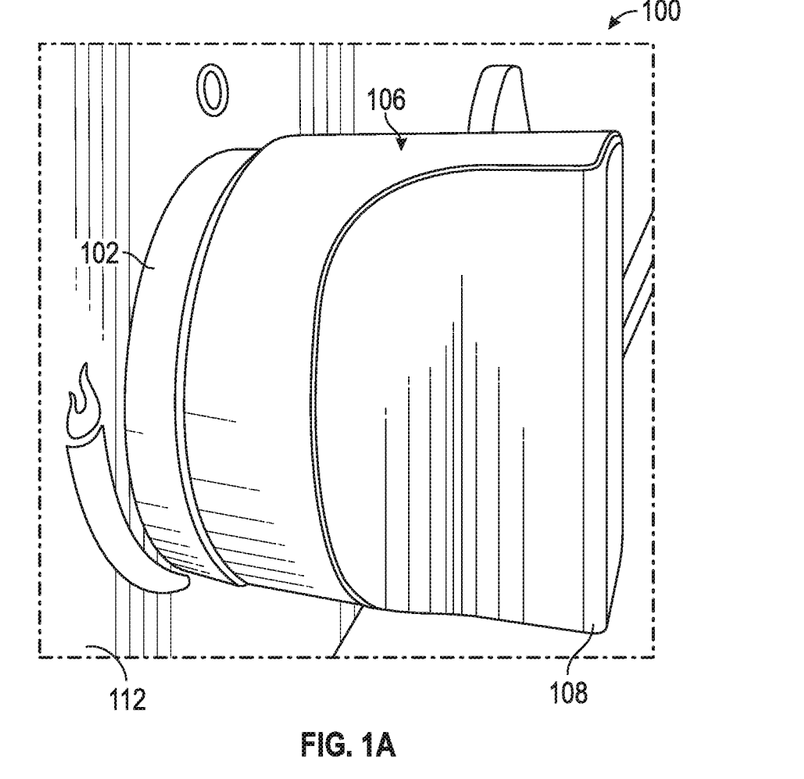
FIGS. 1A-1D depict an example wireless sensor system in accordance with this disclosure.
Figure 1B:
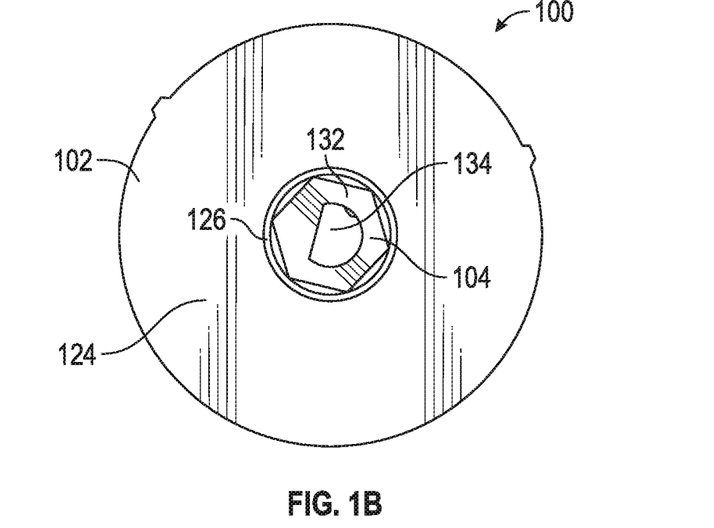
Figure 1C:
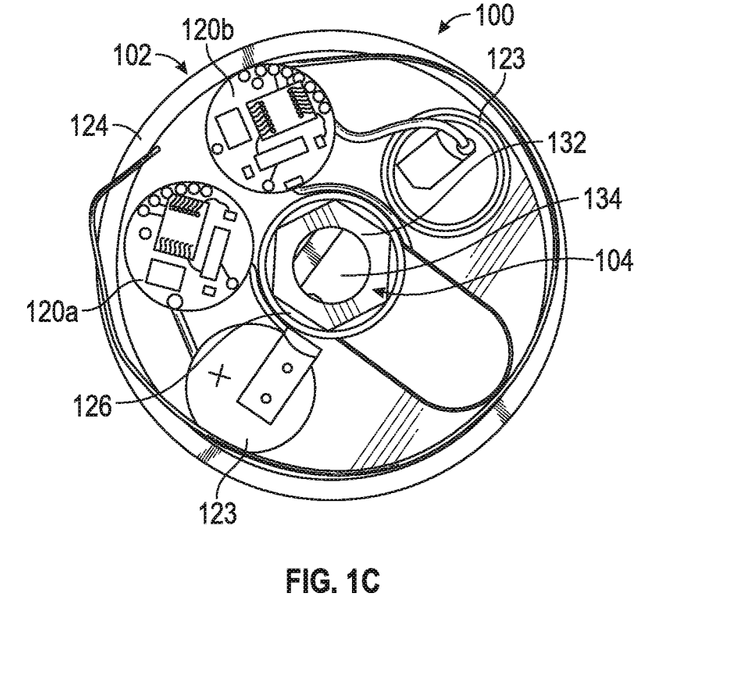

Wireless sensor system 100 is configured to be mounted to the device including rotary actuator 106 between the control knob 108 and the device base 112, as depicted, for example, in FIG. 1A. As noted above, wireless sensor system 100 includes sensor assembly 102 and sensor trigger assembly 104. In examples according to this disclosure, the sensor trigger assembly is mounted to the actuator such that the trigger assembly rotates with the actuator and the sensor assembly including position sensors is mounted such that the sensor assembly remains stationary relative to the actuator.

Sensor assembly 102 includes electronic circuitry including at least two position sensors 120a, 120b and power source(s) 123, and other circuitry/electronics including, for example a wireless transmitter, wireless transceiver, and/or a wireless transmitter and wireless receiver communicatively connected to the sensors 120. In some examples, sensor assembly 102 can include a printed circuit board (PCB) including a number of different components, including position sensors 120, a wireless transmitter/transceiver/receiver, and, optionally, processor(s) and memory. Sensors 120, the wireless transmitter transmitter/transceiver/receiver, and power source(s) 123 are disposed within housing 124. Housing 124, in this example, is a toroidal or annular cylindrical shaped housing with through hole 126 centrally aligned with the center of the housing. In other examples, hole 126 could be eccentrically located on housing 124.

Sensor assembly 102 is configured to be mounted to the device which is actuated by actuator 106. For example, housing 124 can be mounted to the face of device base 112 by, for example, adhesive, mechanical fastener, or other means. Hole 126 has a diameter that is greater than the outer diameter of shaft 110. As such, when housing 124 is positioned with shaft 110 extending there through, hole 126 does not interfere with rotation of shaft 110.

Trigger assembly 104 includes sensor trigger 130 and sleeve 132. Sensor trigger 130 is coupled to and/or disposed on sleeve 132. Sleeve 132 has a hexagonal cross-section with through hole 134 centrally aligned with the center of the sleeve, but can have different cross-sectional shapes in other examples, including, for example, an annular cylindrical shape. The outer dimension of sleeve 132 is smaller than the diameter of through hole 126 of housing 124 of sensor assembly 102. Hole 134 of sleeve 132 is shaped and sized to receive shaft 110 of rotary actuator 106. As depicted in the example of FIGS. 1A-1D, at least a portion of hole 134 has a "D" shape to receive shaft 110 of rotary actuator 106. In this manner, sleeve 132, to which is coupled/on which is disposed sensor trigger 130, is configured to connect to and rotate with shaft 110 and is configured to fit through hole 126 of sensor assembly 102.

Figure 1D:
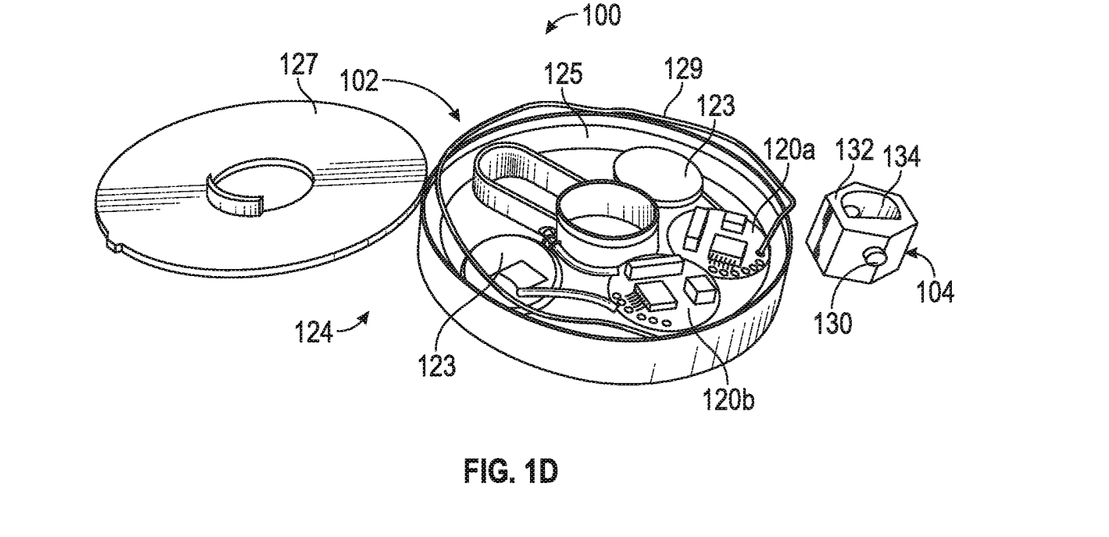

As depicted in FIG. 1D, housing 124 of sensor assembly 102 includes base 125, in which position sensors 120, wireless transmitter/transceiver/receiver, and power source(s) 123 are arranged, and top 127, which is configured to connect to base 125 and cover/enclose position sensors 120, wireless transmitter/transceiver/receiver, and power source(s) 123. Additionally, the electronic circuitry included in sensor assembly 102 includes an antenna 129, which is configured to coil to fit within housing 124, for example, within housing base 125.

Sensors 120 of sensor assembly 102 are magnetic-field detectors and sensor trigger 130 is a permanent magnet. In one example, sensors 120 are reed switches configured to detect the presence/absence of permanent magnet sensor trigger 130. However, different types of sensors and sensor triggers can be employed in other examples in accordance with this disclosure, including radiation or photo detectors, RFID transmitter, or a hall-effect detector/sensor.

Sensors 120 and other components of the electronic circuitry are configured to detect the presence or absence of the sensor trigger 130 in the vicinity of sensors 120. In the example of FIGS. 1A-1D, sensor trigger 130 is coupled to sleeve 132 and is arranged in relatively close proximity to shaft 110 of rotary actuator 106. In this manner, sensor trigger 130 is disposed proximal to the axis of rotation of shaft 110 and rotary actuator 106.

As noted above, the electronic circuitry of sensor assembly includes a wireless transmitter/transceiver/receiver communicatively connected to sensors 120. The wireless transmitter/transceiver/receiver is configured to receive signals from sensors 120 and to transmit information about the position of rotary actuator 106 based thereon. In some embodiments, the wireless transmitter/transceiver/receiver includes a wireless receiver, which can be configured for receiving commands or for receiving acknowledgements and other communications used to execute a communications protocol.

Installing wireless sensor system 100 can be done to retrofit an existing actuator of an appliance or other device, for example, the rotary actuator of a stove, oven, or grill. Once control knob 108 is removed from shaft 110 of rotary actuator 110, housing base 125 can be positioned on device base 112 with shaft 110 passing through hole 126. Housing base 125 of housing 124 of sensor assembly 102 can be coupled to device base 112 with adhesive or some other fastening mechanism. Once installed and coupled to device base 112, housing base 125 (and housing top 127 connected thereto and sensors 120, power source(s) 123, and other circuitry/electronics including, for example a wireless transmitter/transceiver/receiver disposed therein) is stationary and does not move or rotate with or relative to shaft 110 and device base 112. Before coupling housing base 125 to device base 112, sensor trigger assembly 104 including sensor trigger 130 can be assembled and positioned relative to housing base 125 and sensors 120 located therein.

Sleeve 132 of sensor trigger assembly 104 can receive and be coupled to shaft 110 of rotary actuator 106 by receiving shaft 112 in hole 134. Sensor trigger 130 is connected to sleeve 132. As noted above, before fixing sensor assembly 102 including housing base 125 to device base 112, sensor assembly 102 including sensors 120 and sensor trigger assembly 104 including sensor trigger 130 can be positioned relative to one another so that rotation of sensor trigger 130 along with shaft 110 and rotary actuator 106 causes the appropriate signal to be generated by sensors 120.

In some examples, the electronic circuitry of sensor assembly 102, including the sensors 120, can be placed/assembled in housing base 125 at the time of installation of wireless sensor system 100. In other examples, the electronic circuitry is already installed in housing 124. In any case, installation is done in such a manner so as to result in proper alignment between sensor trigger 130 and sensors 120. For example, proper alignment can be with sensors 120 within a sensing distance of sensor trigger 130 when rotary actuator 106 is in an off position. However, in other examples, other alignments are used such as with sensors 120 outside of a sensing distance of the sensors from sensor trigger 130 when rotary actuator 106 is in an on position or a 50% power position.

The electronic circuitry of sensory assembly 102 including sensors 120, wireless transmitter/transceiver/receiver, and antenna 129 is configured to transmit information about the rotational position of rotary actuator 106, from which the operational state of the device actuated thereby can be inferred. In some examples, the wireless transmitter/transceiver/receiver, and antenna 129 are configured to periodically transmit information regarding the rotational position of rotary actuator 106. In other examples, the wireless transmitter/transceiver/receiver, and antenna 129 are configured to report the rotational position of rotary actuator 106 when the rotational position thereof changes. In other examples, the wireless transmitter/transceiver/receiver, and antenna 129 are configured to transmit information regarding the rotational position of rotary actuator 106 when the electronic circuitry of sensor assembly 102 receives a request to do so.

In one example, wireless sensor system 100 is installed on rotary actuator 106 such that the actuator starts in an off position, with sensors 120 in proximity to sensor trigger 130. A user rotates control knob 108, which rotates actuator 106 away from the off position and moves sensor trigger 130 away from sensors 120, which sensors and associated housing 124 remain stationary. The electronic circuitry including wireless transmitter/transceiver/receiver receives signals indicating sensors 120 no longer detect proximity of sensor trigger 130 and based thereon transmits information regarding the change of position of rotary actuator 106. The change of position of rotary actuator 106, for example from an off position to an on position, can be used to infer the operational state of the device actuated by actuator 106, for example, to infer that a stove, oven, grill, etc. has been turned on.

Wireless sensor system 100 includes at least two sensors 120. Including more than one sensor in such devices can have a number of advantages. For example, wireless sensor system 100 with at least two sensors 120 can be configured to sense changes in the position of rotary actuator 106 regardless of the direction of rotation thereof. Actuators on electric stoves can be rotated both clockwise and counter-clockwise to either set the stove heat to a lowest or relatively low setting (in one direction) or to set the stove heat to a highest or relatively high setting (in the opposite direction). Employing at least two sensors in wireless sensor system 100 can enable detection of such an electric stove being turned on regardless of which direction the user rotates the control knob of the actuator. Additionally, employing at least two sensors can improve set-up/installation of wireless sensor system 100, because if a single sensor system is not properly aligned relative to the sensor trigger during installation there may be a risk of false positive signals from the single sensor. Moreover, employing at least two sensors may increase the sensitivity and thereby performance of the system by, in some examples, allowing the sensors to sense both polarities of a magnetic sensor trigger.

Figure 2A:
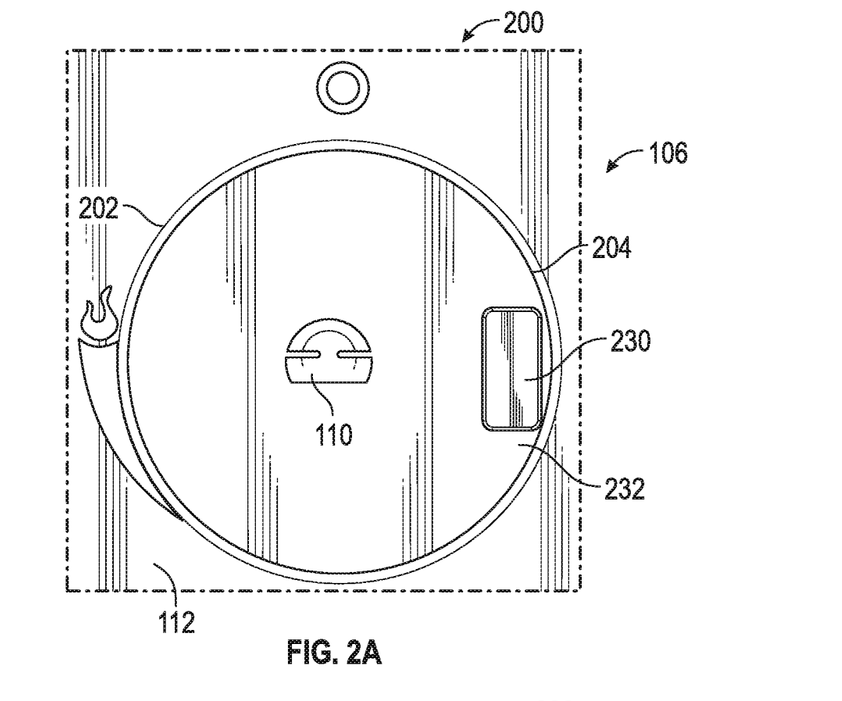
FIGS. 2A-2C depict another example wireless sensor system in accordance with this disclosure.
Figure 2B:
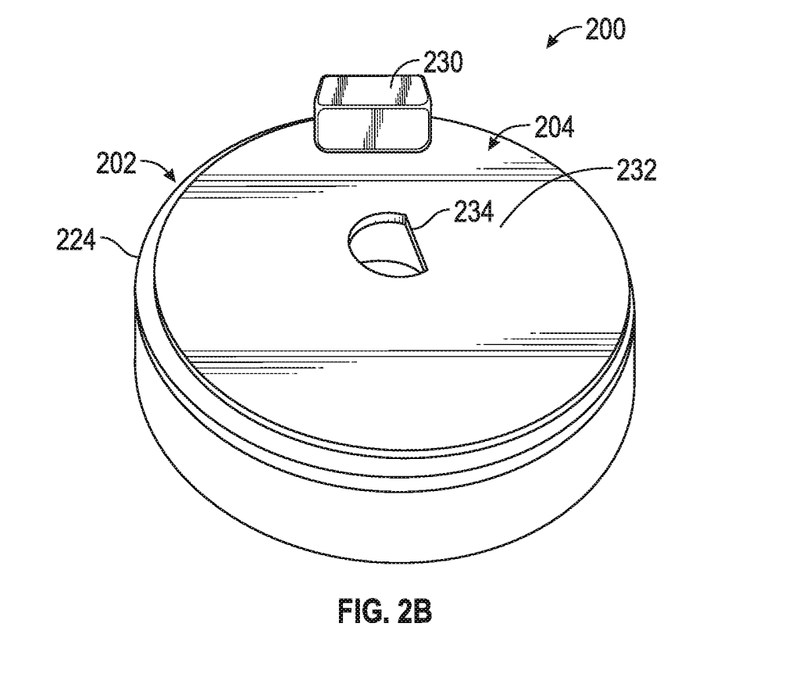
Figure 2C:
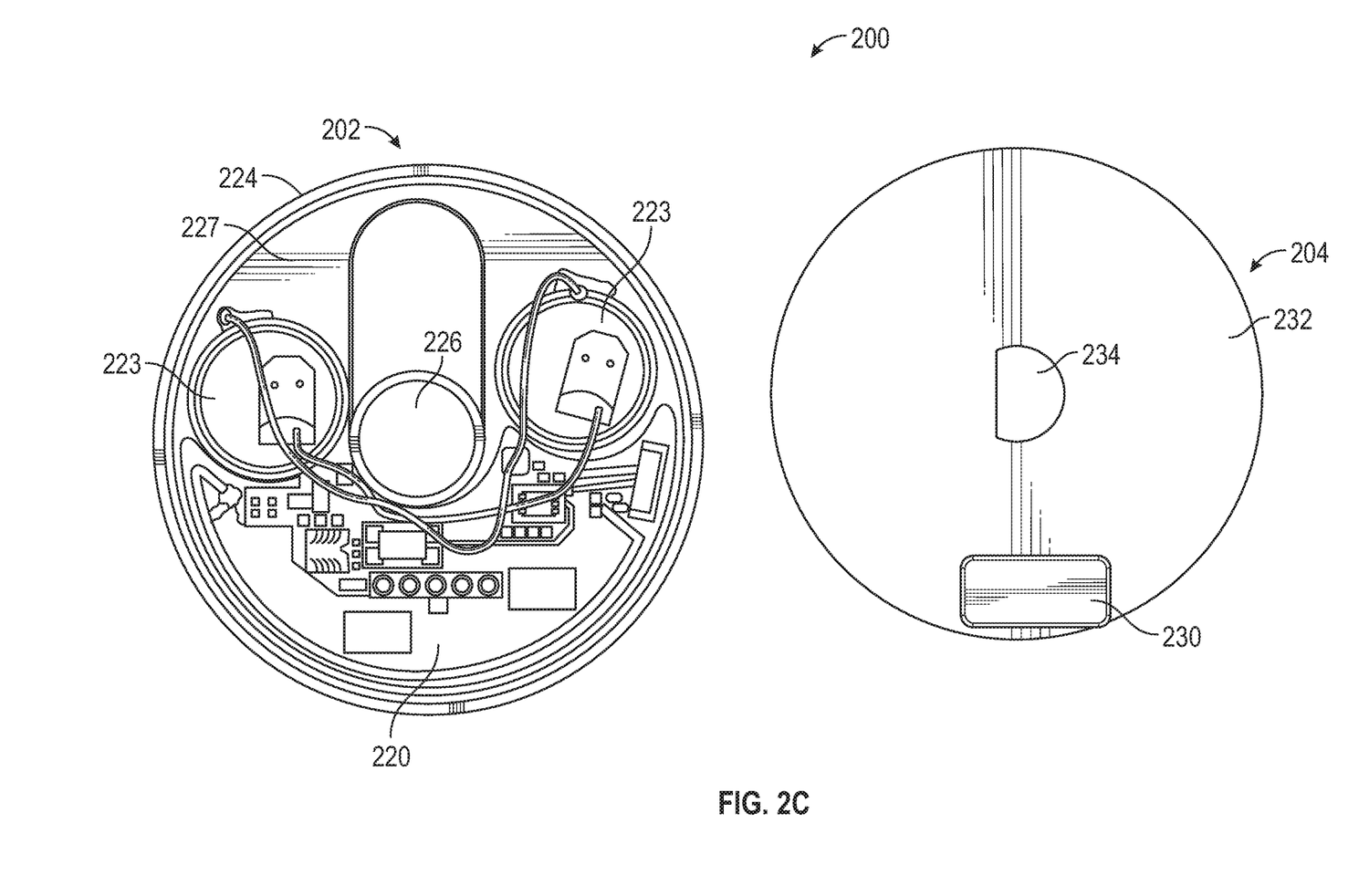

FIGS. 2A-2C depict another example wireless sensor system 200 in accordance with this disclosure. Example wireless sensor system 200 includes sensor assembly 202 and sensor trigger assembly 204. Wireless sensor system 100 is depicted mounted to existing rotary actuator 106 of a device, such as a gas or electric stove, range, or oven. Although this example is described in the context of a specific device like a stove, range or oven, examples according to this disclosure may be applied to and employed in conjunction with other devices and systems.

Rotary actuator 106 includes a control knob (removed in the example of FIGS. 2A-2D), shaft 110, and device base 112. Shaft 110 is rotatably connected to the device (for example, stove) and protrudes through a hole in device base 112. The control knob is removably coupled to shaft 110 such that the two rotate together when control knob is turned. Both the control knob and shaft 110 rotate relative to the stationary base 112.

Wireless sensor system 200 is configured to be mounted to the device including rotary actuator 106 between the control knob and device base 112, as depicted, for example, in FIG. 2A. As noted above, wireless sensor system 200 includes sensor assembly 202 and sensor trigger assembly 204. In examples according to this disclosure, the sensor trigger assembly is mounted to the actuator such that the trigger assembly rotates with the actuator and the sensor assembly including position sensors is mounted such that the sensor assembly remains stationary relative to the actuator.

Sensor assembly 202 includes electronic circuitry including at least two position sensors 220 and power source(s) 223, and other circuitry/electronics including, for example a wireless transmitter, wireless transceiver, and/or a wireless transmitter and wireless receiver communicatively connected to the sensors 220. In some examples, sensor assembly 202 can include a printed circuit board (PCB) including a number of different components, including position sensors 220, a wireless transmitter/transceiver/receiver, and, optionally, processor(s) and memory. Sensors 220, the wireless transmitter transmitter/transceiver/receiver, and power source(s) 223 are disposed within housing 224 of sensor assembly 202. Housing 224, in this example, is a toroidal or annular cylindrical shaped housing with through hole 226 centrally aligned with the center of the housing and an open cavity 227 in which the electronic circuitry is arranged. In other examples, hole 226 can be eccentrically located on housing 224.

Sensor assembly 202 is configured to be mounted to the device which is actuated by actuator 106. For example, housing 224 can be mounted to the face of device base 112 by, for example, adhesive, mechanical fastener, or other means. Hole 226 has a diameter that is greater than the outer diameter of shaft 110. As such, when housing 224 is positioned with shaft 110 extending there through, hole 226 does not interfere with rotation of shaft 110.

Trigger assembly 204 includes sensor trigger 230 and disc 232. Sensor trigger 230 is coupled to and/or disposed on disc 232. Disc 232 is a circular, relatively thin disc with through hole 234 centrally aligned with the center of the disc, but can have different shapes/structures in other examples, including, for example, a square or rectangular, relatively thin plate. Hole 234 of disc 232 is shaped and sized to receive shaft 110 of rotary actuator 106. As depicted in the example of FIGS. 2A-2C, hole 234 has a "D" shape to receive shaft 110 of rotary actuator 106. In this manner, disc 232, to which is coupled/on which is disposed sensor trigger 230, is configured to connect to and rotate with shaft 110. When wireless sensor system 200 is assembled, disc 232 of sensor trigger assembly 204 is positioned over and covers cavity 227 of housing 224 of sensor assembly 202.

As depicted in FIG. 2C, housing 224 of sensor assembly 202 includes cavity 227, in which position sensors 220, wireless transmitter/transceiver/receiver, and power source(s) 223 are arranged. Additionally, the electronic circuitry included in sensor assembly 102 includes an antenna, which, in this example, is incorporated into the circuit board including sensors 220 and wireless transmitter/transceiver/receiver. Sensors 220 of sensor assembly 202 are magnetic-field detectors and sensor trigger 230 is a permanent magnet. In one example, sensors 220 are reed switches configured to detect the presence/absence of permanent magnet sensor trigger 230. However, different types of sensors and sensor triggers can be employed in other examples in accordance with this disclosure, including radiation or photo detectors, RFID transmitter, or a hall-effect detector/sensor.

Sensors 220 and other components of the electronic circuitry are configured to detect the presence or absence of sensor trigger 230 in the vicinity of sensors 220. In the example of FIGS. 2A-2C, sensor trigger 230 is coupled to disc 232 and is arranged in distal to shaft 110 of rotary actuator 106. For example, sensor trigger 230 is arranged proximate, adjacent or at the periphery/outer diameter/outer edge of disc 232 and housing 224. In this manner, sensor trigger 230 is disposed distal to the axis of rotation of shaft 110 and rotary actuator 106.

As noted above, the electronic circuitry of sensor assembly 202 includes a wireless transmitter/transceiver/receiver communicatively connected to sensors 220. The wireless transmitter/transceiver/receiver is configured to receive signals from sensors 220 and to transmit information about the position of rotary actuator 106 based thereon. In some embodiments, the wireless transmitter/transceiver/receiver includes a wireless receiver, which can be configured for receiving commands or for receiving acknowledgements and other communications used to execute a communications protocol.

Installing wireless sensor system 200 can be done to retrofit an existing actuator of an appliance or other device, for example, the rotary actuator of a stove, oven, or grill. Once the control knob of actuator 106 is removed from shaft 110, housing 224 can be positioned on device base 112 with shaft 110 passing through hole 226. Housing 224 of sensor assembly 202 can be coupled to device base 112 with adhesive or some other fastening mechanism. Once installed and coupled to device base 112, housing 224 (and sensors 220, power source(s) 223, and other circuitry/electronics including, for example a wireless transmitter, wireless transceiver, and/or a wireless transmitter and wireless receiver communicatively connected to the sensors 220) is stationary and does not move or rotate with or relative to shaft 110 and device base 112. Before coupling housing 224 to device base 112, sensor trigger assembly 204 including sensor trigger 230 can be assembled and positioned relative to housing 224 and sensors 220 located therein.

Next, disc 232 of sensor trigger assembly 204 can receive and be coupled to shaft 110 of rotary actuator 106 by receiving shaft 112 in hole 234. Sensor trigger 230 is connected to disc 232. As noted above, before fixing sensor assembly 202 including housing 224 to device base 112, sensor assembly 202 including sensors 220 and sensor trigger assembly 204 including sensor trigger 230 can be positioned relative to one another so that rotation of sensor trigger 230 along with shaft 110 and rotary actuator 106 causes the appropriate signal to be generated by sensors 220.

In some examples, the electronic circuitry of sensor assembly 202, including the sensors 220, can be placed in cavity 227 of housing 224 at the time of installation of wireless sensor system 200. In other examples, the electronic circuitry is already installed in housing 224. In any case, installation is done in such a manner so as to result in proper alignment between sensor trigger 230 and sensors 220. For example, proper alignment can be with sensors 220 within a sensing distance of sensor trigger 230 when rotary actuator 106 is in an off position. However, in other examples, other alignments are used such as with sensors 220 outside of a sensing distance of the sensors from sensor trigger 230 when rotary actuator 106 is in an on position or a 50% power position.

The electronic circuitry of sensory assembly 202 including sensors 220 and wireless transmitter/transceiver/receiver is configured to transmit information about the rotational position of rotary actuator 106, from which the operational state of the device actuated thereby can be inferred. In some examples, the wireless transmitter/transceiver/receiver is configured to periodically transmit information regarding the rotational position of rotary actuator 106. In other examples, the wireless transmitter/transceiver/receiver is configured to report the rotational position of rotary actuator 106 when the rotational position thereof changes. In other examples, the wireless transmitter/transceiver/receiver is configured to transmit information regarding the rotational position of rotary actuator 106 when the electronic circuitry of sensor assembly 202 receives a request to do so.

In one example, wireless sensor system 200 is installed on rotary actuator 106 such that the actuator starts in an off position, with sensors 220 in proximity to sensor trigger 230. A user rotates the control knob, which rotates actuator 106 away from the off position and moves sensor trigger 230 away from sensors 220, which sensors remain stationary. The electronic circuitry including wireless transmitter/transceiver/receiver receives signals indicating sensors 220 no longer detect proximity of sensor trigger 230 and based thereon transmits information regarding the change of position of rotary actuator 106. The change of position of rotary actuator 106, for example from an off position to an on position, can be used to infer the operational state of the device actuated by actuator 106, for example, to infer that a stove, oven, grill, etc. has been turned on.

Wireless sensor system 200 includes at least two sensors 220 and thereby can have some of the same advantages described above with reference to example wireless sensing system 100. Additionally, as noted above, sensor trigger assembly 204 includes sensor trigger 230 disposed distal to the axis of rotation of rotary actuator 106. Positioning the sensor trigger distal to the axis of rotation of the rotary actuator may produce a number of advantages/benefits. For example, in such arrangements, the sensor trigger may be closer to and thereby improve the sensitivity of the position sensors in the sensor assembly.

Various examples in accordance with this disclosure have been described. These and other examples are within the scope of the following claims.

What is claimed is:

1. A wireless sensor system comprising:
a sensor assembly, the sensor assembly comprising:
a housing configured to be coupled to a device actuated by a rotary actuator, the housing comprising an aperture through which a rotatable shaft of the rotary actuator is configured to be arranged;
at least two position sensors disposed within the housing; and
a power source disposed within the housing and configured to provide power to the at least two position sensors,
the housing and the at least two position sensors and the power source disposed therein being coupled to the device such that the sensor assembly is stationary; and
a sensor trigger assembly, the sensor trigger assembly being configured to be coupled to and rotate with the rotatable shaft of the rotary actuator, the sensor trigger assembly comprising:
a sensor trigger carrier configured to be coupled to the rotatable shaft; and
a sensor trigger connected to the sensor trigger carrier, the at least two position sensors being disposed in a first position relative to the sensor trigger to sense a change in a rotational position of the sensor trigger when the rotatable shaft rotates, wherein the sensor trigger carrier comprises a sleeve, the sleeve comprising a hole that is configured to receive the rotatable shaft of the rotary actuator, and the sleeve being sized to fit within the aperture of the housing.

2. The wireless sensor system of claim 1, further comprising a wireless transmitter disposed within the housing and communicatively coupled to the at least two position sensors.

3. The wireless sensor system of claim 2, wherein the wireless transmitter is configured to receive one or more signals from the at least two position sensors and to transmit information regarding a position of the rotary actuator to a remote device based on the one or more signals received from the at least two position sensors.

4. A wireless sensor system comprising:
a sensor assembly, the sensor assembly comprising:
a housing configured to be coupled to a device actuated by a rotary actuator;
at least two position sensors disposed within the housing; and
a power source disposed within the housing and configured to provide power to the at least two position sensors,
the housing and the at least two position sensors and the power source disposed therein being coupled to the device such that the sensor assembly is stationary; and
a sensor trigger assembly, the sensor trigger assembly being configured to be coupled to and rotate with a rotatable shaft of the rotary actuator, the sensor trigger assembly comprising:
a sensor trigger carrier configured to be coupled to the rotatable shaft; and
a sensor trigger connected to the sensor trigger carrier, the at least two position sensors being disposed in a first position relative to the sensor trigger to sense a change in a rotational position of the sensor trigger when the rotatable shaft rotates, wherein the sensor trigger carrier comprises a disc, the disc comprising a hole that is configured to receive the rotatable shaft of the rotary actuator.

5. The wireless sensor system of claim 4, wherein the sensor rigger is disposed adjacent a periphery of the disc.

6. The wireless sensor system of claim 4, wherein the disc comprises a circular disc and the sensor trigger is disposed adjacent an outer diameter of the circular disc.

7. A method comprising:

removing a control knob from a rotatable shaft of a rotary actuator of a device;

coupling a sensor assembly to the device, the sensor assembly being coupled to the device such that the sensor assembly is stationary, the sensor assembly comprising:

a housing configured to be coupled to the device actuated by the rotary actuator;

at least two position sensors disposed within the housing; and a power source disposed within the housing and configured to provide power to the at least two position sensors;

coupling a sensor trigger assembly to the rotatable shaft, the sensor trigger assembly comprising:

a sensor trigger carrier configured to be coupled to the rotatable shaft; and a sensor trigger connected to the sensor trigger carrier;

arranging the at least two position sensors in a first position relative to the sensor trigger to sense a change in a rotational position of the sensor trigger when the rotatable shaft rotates; and replacing the control knob on the rotatable shaft.

8. The method of claim 7, wherein the sensor assembly comprises a wireless transmitter disposed within the housing and communicatively coupled to the at least two position sensors, and further comprising:

receiving, by the wireless transmitter, one or more signals from the at least two position sensors; and transmitting, by the wireless transmitter, information regarding a position of the rotary actuator to a remote device based on the one or more signals received from the at least two position sensors.

* * * * *

UNITED STATES PATENT AND TRADEMARK OFFICE
CERTIFICATE OF CORRECTION

PATENT NO.      : 10,732,012 B2
APPLICATION NO. : 15/945253
DATED           : August 4, 2020
INVENTOR(S)     : Wimmer et al.

It is certified that error appears in the above-identified patent and that said Letters Patent is hereby corrected as shown below:

On page 2, in Column 2, under "Other Publications", Line 13, delete ""Machnine" and insert --"Machine-- therefor In Column 8, Line 67, in Claim 5, delete "rigger" and insert --trigger-- therefor Signed and Sealed this
Fifth Day of January, 2021

Andrei Iancu
*Director of the United States Patent and Trademark Office*